United States Patent

Chiron et al.

[11] Patent Number: 5,542,808
[45] Date of Patent: Aug. 6, 1996

[54] APPARATUS ON A VEHICLE TO PICK UP A LOAD

[75] Inventors: Alain Chiron, St Romain le Puy; Albert Heritier, Veauche, both of France

[73] Assignee: Marrel, France

[21] Appl. No.: 230,321

[22] Filed: Apr. 20, 1994

[30] Foreign Application Priority Data

Apr. 20, 1993 [FR] France .................................. 93 04633

[51] Int. Cl.[6] ........................................................ B60P 1/64
[52] U.S. Cl. ............................. 414/498; 414/491; 414/546
[58] Field of Search .................................. 414/498, 546, 414/680, 478, 491, 492, 493, 555, 732, 738; 284/93 R, 8 R

[56] References Cited

U.S. PATENT DOCUMENTS

| | | | |
|---|---|---|---|
| 3,825,137 | 7/1974 | Mackrill et al. | 414/498 |
| 4,453,878 | 6/1984 | Paukku | 414/491 |
| 5,102,284 | 4/1992 | Raisio | 414/546 X |
| 5,108,247 | 4/1992 | Vlaanderen | 414/498 X |

FOREIGN PATENT DOCUMENTS

| | | | |
|---|---|---|---|
| 358541 | 3/1990 | European Pat. Off. | 414/546 |
| 2109109 | 5/1972 | Germany. | |
| 2325866 | 12/1973 | Germany. | |
| 4138512 | 5/1993 | Germany. | |
| 2170184 | 7/1986 | United Kingdom | 414/498 |
| 8601469 | 3/1986 | WIPO | 414/498 |

OTHER PUBLICATIONS

Moser–Hakeneystem.

*Primary Examiner*—Frank E. Werner
*Attorney, Agent, or Firm*—Remy J. VanOphem; John VanOphem

[57] ABSTRACT

An apparatus which includes a tilting jack of which the axis on which it is articulated to the tilting structure is in front of the axis on which it is articulated on the frame and in which the tilting structure and the frame are so adapted that the effect of actuating the tilting jack is to cause a lifting hook to tilt about a first transverse tilting axis between a position for starting or finishing tilting and a position for changing the axis, and about a second transverse tilting axis between the position for changing the axis and a position for picking up a load from, or setting down on, the ground.

23 Claims, 11 Drawing Sheets

APPARATUS ON A VEHICLE TO PICK UP A LOAD

BACKGROUND OF THE INVENTION

1. Field of the Invention

This invention relates to an apparatus for enabling a vehicle to pick up from, or set down on, the ground a load such as a skip, this load being provided with a lifting eye on a front face and with two longitudinal rails situated respectively on the right- and left-hand sides of a lower face of the load.

2. Description of the Prior Art

Such an apparatus is known, corresponding to that described in French Patent 2,185,520, but in which the jib is telescopic as is disclosed in French Patent 2,109,109.

The known apparatus includes:

a frame which is arranged to be fixed on the chassis of the vehicle;

a tilting manipulating structure mounted on the frame, including a telescopic jib and a false chassis, the jib being articulated at the rear on the false chassis, which is itself articulated at the rear on the frame at the rear of the latter, the jib having a hook which is arranged to engage with the lifting eye of a load, the two articulating members, which are carried by the tilting structure between the jib and the false chassis and between the false chassis and the frame, respectively, being arranged so as to define for the hook either a first or a second transverse tilting axis, respectively, with the tilting structure being capable of assuming a position for setting down on or picking up from the ground, in which the hook is behind the vehicle at a height which enables it to engage with or be released from the lifting eye of a load placed on the ground behind the vehicle, and a transport position in which the tilting structure has at the front one of the portions of the jib which is vertical or nearly vertical and at the top of which the hook is situated;

a jib jack for elongating or shortening the other portion of the jib, which is horizontal or nearly horizontal in the transport position, with this portion being elongated in the transport position and shortened in a position for starting or finishing tilting, which is reached from the transport position by actuating the jib jack in the shortening sense; and a tilting jack which is articulated at the front on the frame and at the rear on the jib, so as to cause the tilting structure to tilt between the position for starting or finishing tilting and the pick up or set down position, the tilting structure being adapted to cooperate with the frame in such a way that there exists, between the position for starting or finishing tilting and the pick up or set down position, a position for changing the articulating member which is reached when the jib comes into abutment on the false chassis, with the hook turning about the first tilting axis (defined by the member articulating the jib to the false chassis) between the position for starting or finishing tilting and the position for changing the articulating member, and about the second tilting axis (the member articulating the false chassis to the frame) between the position for changing the articulating member and the pick up or set down position.

The present invention proposes to provide an apparatus of the same nature, but with improved performance.

SUMMARY OF THE INVENTION

According to the present invention, the arrangement of the tilting jack enables the first and second articulating members to be disposed on the tilting structure in such a way that the tilting jack is able to work with a lever arm which is relatively large, both in the position for starting or finishing tilting (in which the lever arm is defined with respect to the first tilting axis) and also in the pick up or set down position (in which the lever arm is defined with respect to the second tilting axis), as more fully set forth hereinafter.

It is an object of the invention to provide, in the position for starting or finishing tilting, a lever arm which is substantially greater than that which is possible with the above mentioned prior art apparatus. It thus offers the advantage of providing the same services with a tilting jack which is less powerful than in the above mentioned prior art apparatus, and also enables use to be made of a smaller quantity of steel, or of steel with lower mechanical strength characteristics, because the forces that have to be supported by the apparatus are reduced.

A further object of the invention is to provide an arrangement of the jack which enables an apparatus to be produced which is efficient and cost effective.

A yet further object of the invention is to provide a jack which is articulated on the frame at the rear to enable the front cross member which existed on the above mentioned prior art apparatuses, in which the jack was articulated on the frame at the front, to be omitted.

A still further object of the invention is to eliminate the front cross member which is advantageous in the context of the forces applied to the longitudinal members of the chassis of the vehicle, firstly because the application zone for the forces on the latter is close to the rear axle or axles, and secondly because the frame is more flexible and consequently does not adversely affect the elastic deformation of the chassis of the vehicle during travelling.

Another object of the invention is to eliminate the front cross member from the frame to make its fitting on the chassis of the vehicle easier, since there is no hindrance from the presence, behind the engine of the vehicle, of certain components such as the gearbox, the operating gear, or the transmission.

Finally, an object of the invention is to eliminate the front cross member to improve accessibility for maintenance of the engine of the vehicle.

Preferred features of the invention follow.

According to the invention, in the position for starting or finishing tilting, the second jack axis lies between the first jack axis and the first tilting axis, and below each of the latter, the lever arm with which the tilting jack works in the position of starting or finishing tilting is maximized, having regard to the constraint of having a height dimension as small as possible for that portion of the apparatus that lies below the load.

Having regard to the variation in inclination of the line of action of the tilting jack, the fact of disposing the second tilting axis, when it is in the pick up or set down position, behind and below the position occupied by the first tilting axis in the position for starting or finishing tilting, enables the lever arm with which the tilting jack works in the pick up or set down position to be maximized.

In this connection, it will be noted that if only one articulating member were arranged on the tilting structure, this being disposed on the first tilting axis as discussed above, then there would be a lever arm which would be excellent in the position for starting or finishing tilting but too small in the pick up or set down position. Similarly, if the articulating member were arranged on the second tilting axis as discussed above, the lever arm would be excellent in the pick up or set down position but too small in the position for starting or finishing tilting.

It is thus seen that the performance of the present invention results from the effects of a combination between the disposition of the tilting jack and the changing of the articulating member, which is carried out in such a way that, at any moment, there will be a judiciously disposed tilting axis having regard to the change in orientation of the jack.

According to additional features of the invention, the jib deforms, as between the transport position and the position for starting or finishing tilting, respectively, between a configuration in which its vertical portion makes a right angle or nearly a right angle with the support beam, and a configuration in which the vertical portion makes a smaller angle (for example 60 degrees) with the support beam. Such a deformation enables the degree of tilting necessary between the position for starting or finishing tilting and the pick up or set down position to be reduced: with an equal degree of rearward tilting, the hook is lower if the jib is deformed in this way than if it were kept with the vertical portion at a right angle with respect to the support beam. Preferably, the fork includes a nose.

The raising of the first jack axis effected by the nose further inclines the line of action of the tilting jack in the direction which increases its distance with respect to the first tilting axis, and therefore in the direction which increases the lever arm with which the jack works in the position for starting or finishing tilting, which further improves the efficiency and performance of the apparatus in accordance with the invention.

According to an embodiment of the invention, the tilting structure is inflexible under the forces applied by the tilting jack during the whole of the movement between the position for starting or finishing tilting and the pick up or set down position. This embodiment, which is particularly simple, is suitable in those cases in which it is sufficient that the apparatus should be able to pick up a load from the ground or put it down on the ground.

According to a further embodiment of the invention, the fact that the tilting structure remains inflexible only between the position for starting or finishing tilting and the position for changing the articulating member, whereas, between the position for changing the articulating member and the pick up or set down position, the rigid arm remains held to the frame while the remainder of the tilting structure pivots with respect to the rigid arm, enables the changing of the articulating member to be achieved in a particularly simple, reliable and inexpensive way.

In addition, this embodiment permits the construction, if desired, of an apparatus which can also carry out tipping maneuvers, that is to say one which is able to raise the load at the front until it is inclined by a large enough angle to enable it to be emptied by gravity after its rear doors have been opened.

Preferred features for enabling such tipping movements enable an apparatus to be obtained in a particularly simple, convenient and inexpensive way, and which can perform maneuvers both for picking up the load from, and setting it down on, the ground, and for tipping the latter.

According to the invention, support members are provided which are situated at the rear of the rigid arm, and are maintained coaxial with the tipping axis when the immobilizing means are in operation, and they are lowered towards the frame going from the position for starting or finishing tilting to the position for changing the articulating member, and vice versa.

The mobility of the support members permits them to be able to remain outside the path followed by the rails between the position for changing the articulating member and the pick up or set down position.

According to a further feature of the invention, the apparatus has rear engagement points for the load which are different during pick up or set down maneuvers and during tipping maneuvers, with these engagement points being defined, respectively, by rollers and by the support members. Due to the fact that the support members are situated entirely at the back of the apparatus and the vehicle, whereas the rollers are further forward, a limitation in the inclination of the load when it is picked up from the ground or set down on it, and a facility for tipping at a large angle without any danger of causing the rear of the skip to strike on the ground or on any of its contents which it has previously shed is obtained.

Further objects, features and advantages of the invention will be apparent from the detailed description of the preferred embodiment which follows which is given by way of non-limiting example only taken in conjunction with the attached drawings.

DETAILED DESCRIPTION OF THE PREFERRED EMBODIMENT

Figure 1:
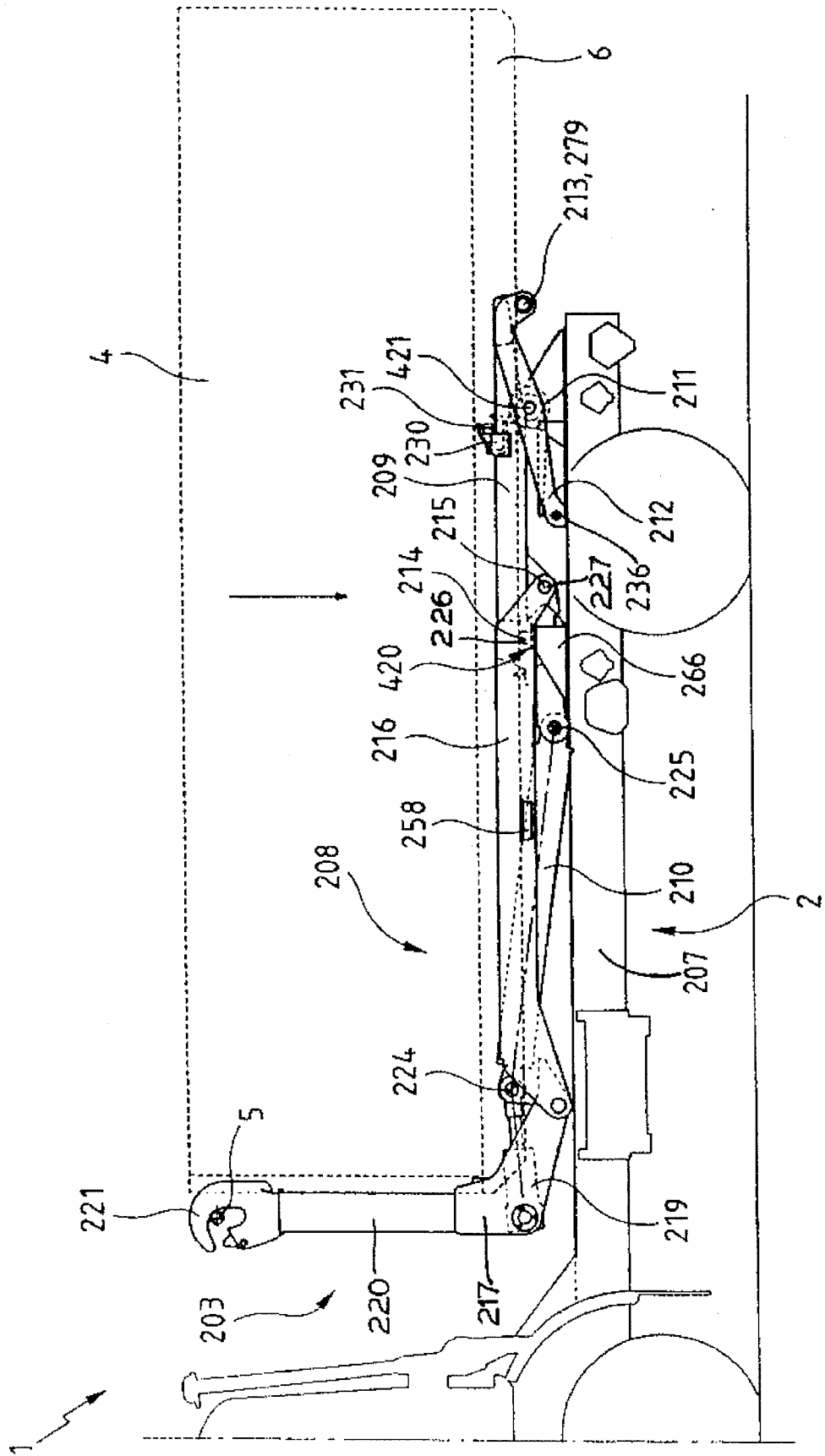
FIG. 1 is a view in elevation as seen from the left-hand side of a vehicle equipped with an apparatus in accordance with the invention, for picking up a load from the ground or setting it down on the ground, and for carrying out tipping maneuvers, the apparatus being shown loaded in a transport position, with the longitudinal members of the frame and the elements external to the latter being omitted for clarity in the drawing.

According to the invention, a heavy goods vehicle or lorry 1, which is shown in FIGS. 1 to 5, embodies a support chassis 2 on which there is mounted an apparatus 203 in accordance with the invention, for manipulating a load such as a skip 4 shown in broken lines, which is provided, in the well-known way (see the standards AFNOR NF R 17-108 and DIN 30722), with a lifting eye 5 on its front face and with two longitudinal rails 6 arranged, respectively, on the right- and left-hand sides on its lower face.

The apparatus 203 embodies a frame 207 fixed on the chassis 2; a tilting, manipulating structure which is mounted on the frame 207, including a jib 208 and a rigid arm 209; a hydraulic tilting jack 210 disposed between the frame 207 and the jib 208; a roller 211 mounted for rotation on the frame 207 and arranged, one on each side, for cooperation with the respective right- or left-hand rail 6 of the load 4; a lever 212, which is also arranged with one on each of the right- and left-hand sides, being articulated at its rear end on the rear of the rigid arm 209 and close to its center on the same trunnion as that on which the roller 211 is mounted for rotation, each lever 212 being extended forward from this articulation; and, again on each side, a transverse support member 213 which is mounted coaxially with the articulation between the rigid arm 209 and the lever 212, and which is arranged to cooperate with the rail 6 lying on the corresponding side of the load 4.

The rigid arm 209 carries at the front (see also FIGS. 6 and 7) a first articulating member 214 and a second articulating member 215, each of which has a transversely orientated central axis. The remainder of the tilting structure, that is to say the jib 208, includes a support beam 216 having at one of its ends a rotatable mount, which cooperates with the second articulating member 215 so that the jib 208 is articulated with respect to the arm 209 about the central axis of the second articulating member 215; a fork 217 (also see FIGS. 8 and 9), which is articulated at the other end of the support beam 216 about a deformation axis 218 orientated transversely; and a jib jack 219 arranged between the support beam 216 and the fork 217. The jib jack 219 in this example is hydraulic, but in a modification it may be pneumatic, especially for smaller sized skips.

The jib 208 has at the front an arm 220, which in the transport position shown in FIGS. 1 and 8 to 10 is vertical or nearly vertical and which is part of the fork 217. The arm 220 is provided at its upper end with a hook 221 which is arranged to engage with the lifting eye 5 of the load 4. The support beam 216 is horizontal or nearly horizontal, and it lies substantially at (in this example slightly above) the level of the frame 207. The jib jack 219, which is pivoted at each end about a transversely orientated axis, is extended in the transparent position.

Figure 2:
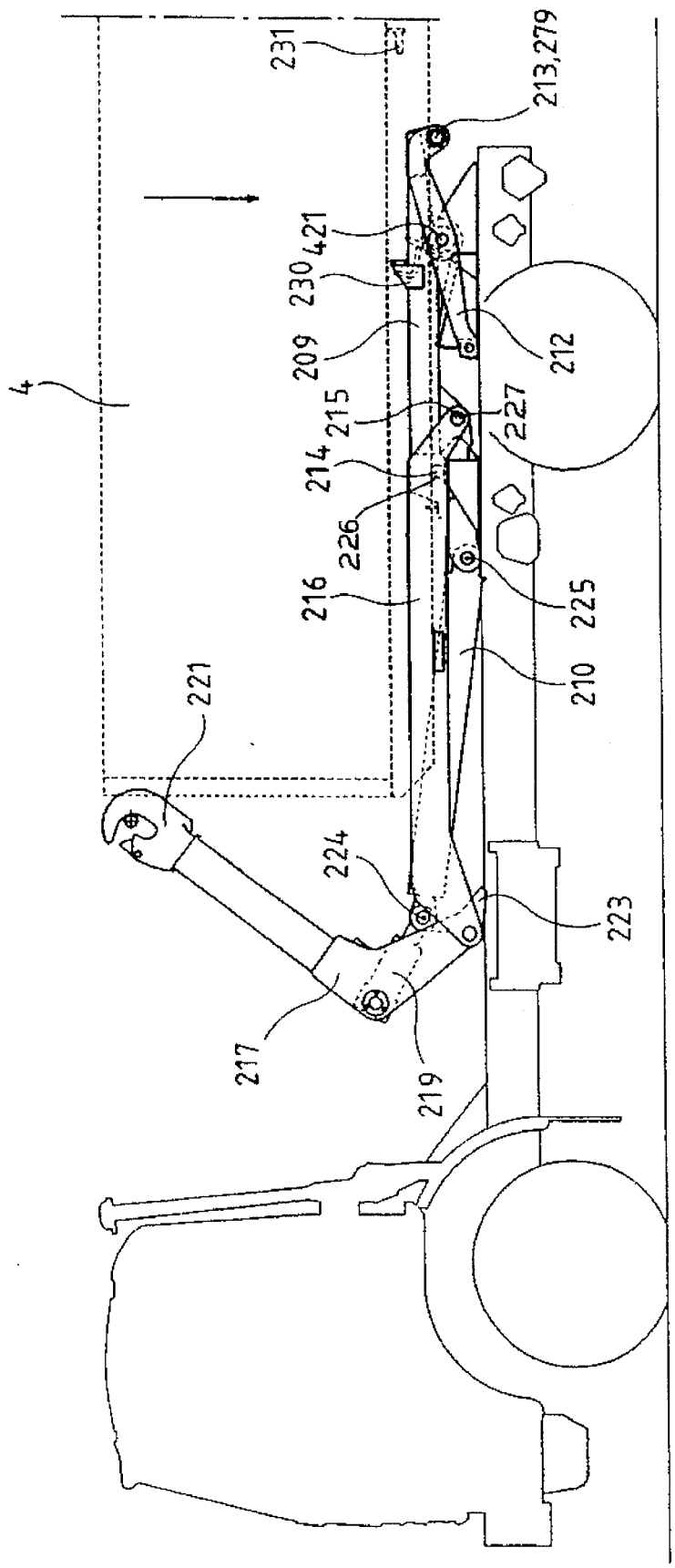
FIG. 2 is a similar view to FIG. 1, but with the apparatus shown in the position for starting or finishing a tilting movement.

When the ram of the jib jack 219 is caused to retract, the jib 208 deforms, with the fork 217 pivoting with respect to the support beam 216 about the deformation axis 218, until the position of start or finish of tilting, shown in FIG. 2, is reached, in which position the arm 220 makes an angle, preferably of approximately 60 degrees, with the support beam 216. The lifting hook 221, and therefore the eye 5, describes between the transport position and the position of start or finish of tilting (FIGS. 1 and 2 respectively) an arc of a circle centered on the deformation axis 218, and the effect of this movement is to cause the load 4 to be moved backwards with respect to the lorry 1, with the rails 6 riding on the rollers 211.

It will be observed that the fork 217 has a nose 223 which lies rearwards of the axis 218 in the transport position, and which is adapted to come into engagement on the chassis 2 when the jib is deformed from the transport position to the position of start or finish of tilting, so that the front of the support beam 216 is raised slightly on passing from the transport position to the position of start or finish of tilting. The tilting jack 210, the ram of which is pivoted to the front of the support beam 216 about a first transverse jack axis 224, with its body being pivoted on the frame 207 about a second transverse jack axis 225, then undergoes a slight upward shift of its line of action towards the vertical.

Figure 4:
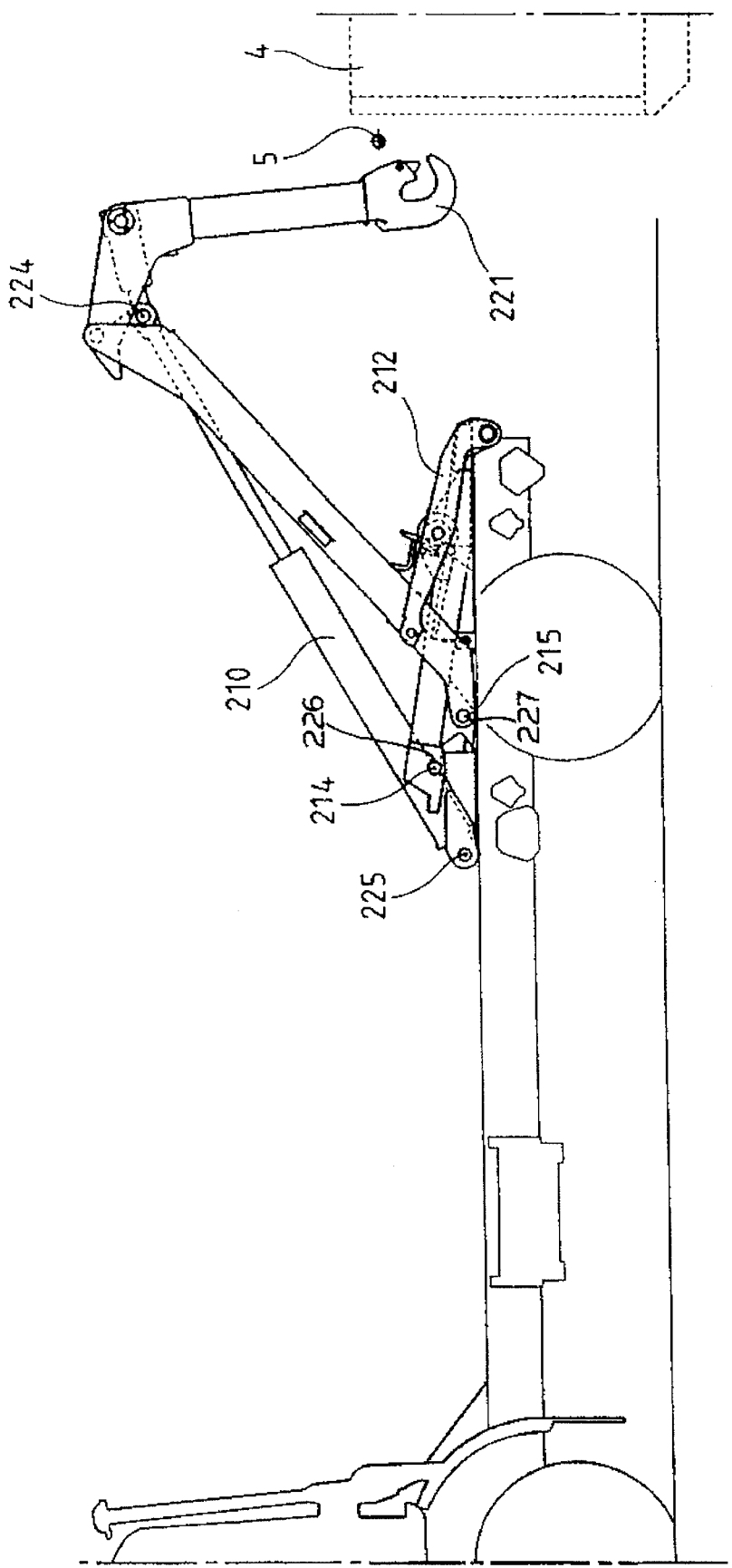

The apparatus 203 is arranged so that the ram of the tilting jack 210 is then caused to be extended so that the tilting structure or jib 208 formed by the rigid arm 209 and the beam 216 passes from the position of start or finish of tilting shown in FIG. 2 to the setting down or picking up position shown in FIG. 4, in which the lifting hook 221 is behind the vehicle 1, at a height which enables it to become engaged with, or to be released from, the lifting eye 5 of the load 4 placed on the ground, or even slightly below the level of the road wheels of the lorry 1 as shown in FIG. 4.

Figure 3:
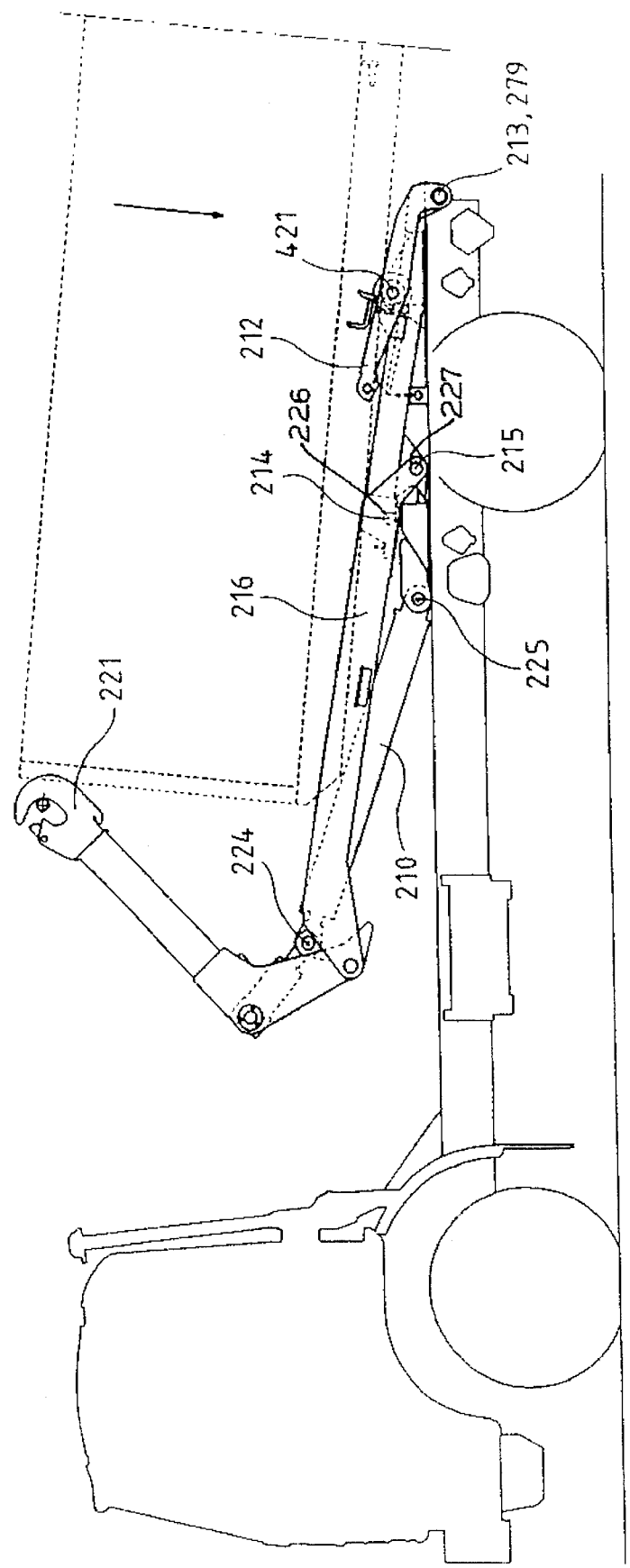
FIGS. 3 to 5 are similar views, respectively, in the position for changing the articulating member, in the position for picking up from, or setting down on, the ground, and in a tipping position.
Figure 7:
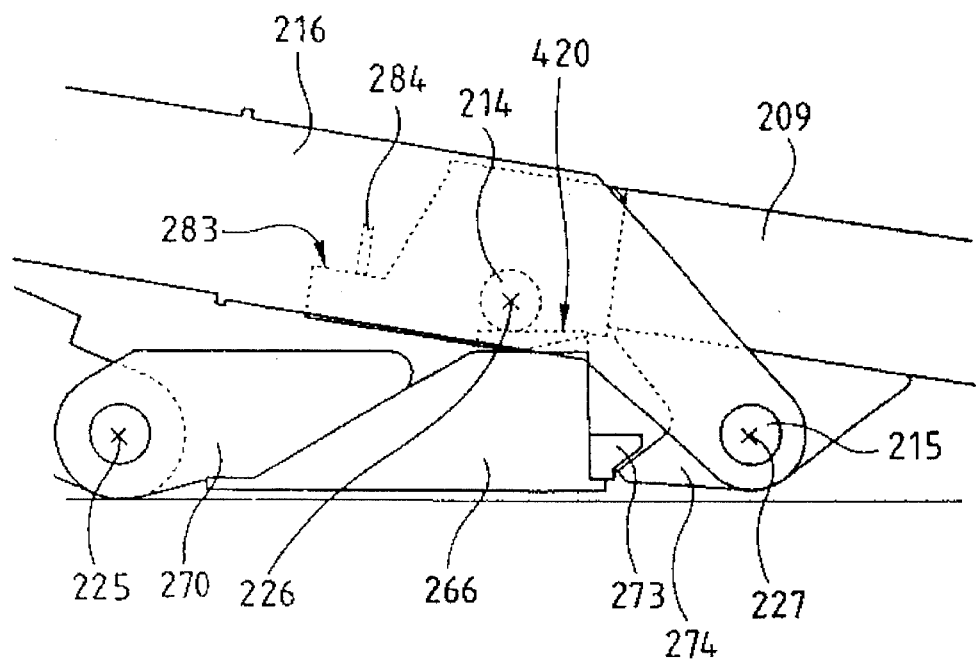

From the position of start or finish of tilting (FIG. 2) to the set down or pick up position (FIG. 4), the lifting hook 221, and therefore the eye 5, tilt firstly about a first transverse tilting axis 226 which corresponds to the central axis of the first articulating member 214, until the position for changing the articulating member shown in FIGS. 3 and 7 is reached, and beyond this position for changing the articulation member, the lifting hook 221 tilts about a second transverse tilting axis 227 which corresponds to the central axis of the second articulating member 215.

The operation of the apparatus which has just been described, in which it passes from the position of FIG. 1 to that of FIG. 4, corresponds to an operation of setting the load 4 down on the ground. In order to pick up such a load from the ground, the operation of the apparatus 203 is similar, but is carried out in the reverse order. Of course, if the lorry 1 has arrived empty for the purpose of picking up a skip 4 from the ground, the apparatus 203 will have passed from the transport position to the set down or pick up position by an operation carried out while it is empty; and similarly, the apparatus will have passed from the set down or pick up position to the transport position by operating while empty if the lorry has arrived with a load 4 which it has put down on the ground, having then left without needing to pick up another load.

It will be observed that the first transverse tilting axis 226 is above and rearwards of the second transverse jack axis 225, and that in the position for start or finish of tilting (FIG. 2), the first transverse jack axis 224 is above and forwards of the second transverse jack axis 225. The line of axis of the tilting jack 210, which passes through the first and second transverse jack axes 224 and 225, is thus relatively distant from the first transverse tilting axis 226, that is to say the tilting jack 210 defines a relatively large lever arm in the position for start or finish of tilting. This lever arm is also increased by the slight raising of the first transverse jack axis 224 which is caused by the nose 223, going from the transport position to the position for start or finish of tilting.

It will also be observed that the second transverse tilting axis 227 is rearwards of and below the first transverse tilting axis 226, and that in the set down or pick up position (FIG. 4), the first transverse jack axis 224 is above and rearwards of the second transverse jack axis 225. Here again, the tilting jack 210 defines a relatively large lever arm with respect to the second transverse tilting axis 227.

In order to permit the automatic changing of the articulating member which occurs in the position of FIG. 3, the tilting structure constituted by the rigid arm 209 and jib 208 is adapted so that the tilting jack 210 maintains it in an inflexible condition between the position for start or finish of tilting (FIG. 2) and the position for changing the articulating member (FIG. 3), while the frame 207 has engagement provisions for the first and second articulating members 214 and 215 that are carried by the arm 209. The engagement provisions are adapted so that the first articulating member 214 will be held in engagement with the frame when going from the position for start or finish of tilting to the set down or pick up position, and are also adapted so that the second articulating member 215 is free to pivot with respect to the frame, about the first transverse tilting axis 226, between the position for start or finish of tilting (FIG. 2) and the position for changing the articulating member (FIG. 3), and will be held in engagement on the frame between the position for changing the articulating member (FIG. 3) and the pick up or set down position (FIG. 4), with its central axis concentrically disposed with the second transverse tilting axis 227.

The engagement provisions with which the frame 207 is provided are thus adapted so as to maintain the rigid arm 209 in engagement on the frame between the position for changing the articulating member (FIG. 3) and the pick up or set down position (FIG. 4), with the remainder of the tilting structure, that is to say the jib 208, being adapted so that the tilting jack 210 causes it to pivot between these positions with respect to the rigid arm 209, about the second transverse tilting axis 227.

The rigid arm 209 thus pivots with respect to the frame 207 about the first transverse tilting axis 226, between the position of FIG. 2 and that of FIG. 3, whereas it remains held to the frame between the position of FIG. 3 and that of FIG. 4.

In consequence, in order that the apparatus 203 can pick a load 4 up from the ground or put it down, it is necessary that the levers 212 be able to pass from the position in which they are shown in FIGS. 1 and 2, in which they are inclined so that their front end is at a lower level than their rear end, to the position of FIGS. 3 and 4 in which they are inclined in the opposite direction.

Figure 5:
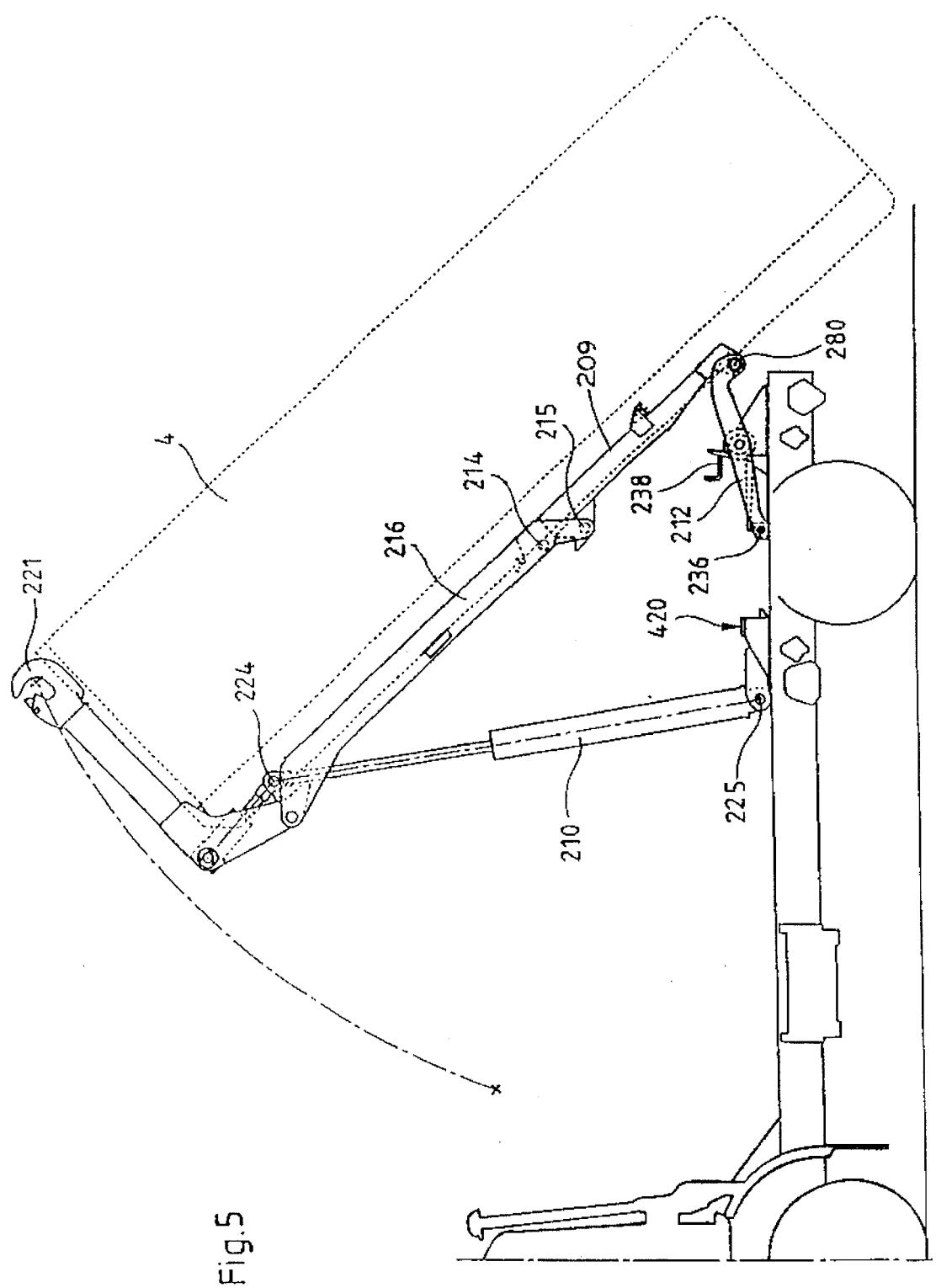

Alternatively, if by contrast the levers 212 are blocked against movement in the transport position, then if the support beam 216 and the rigid arm 209 are stiffened so as to prevent the jib 208 from being able to pivot about the rigid arm 209, and if the engagement provisions of the frame 207 are so adapted as to leave the first articulating member 214 free to pivot about the articulation between the lever 212 and the arm 209, it then becomes possible for the jib 208 to pivot about an articulation axis 280 of the transverse support member 213 when the tilting jack 210 is actuated starting from the transport position (FIG. 1), up to the tipping position shown in FIG. 5: the load 4 has itself pivoted about the articulation axis 280 and becomes inclined with its front end raised and its rear end lowered, which enables it to be emptied on to the ground if its rear door has been opened.

In the embodiment shown in FIGS. 1 to 5, the stiffening means capable of acting so as to prevent the jib 208 from pivoting with respect to the rigid arm 209 make use of the rigidity of the load 4 and the well-known abutments (see standard AFNOR NF R 17-108) which serve for the correct positioning of the center of gravity of the load 4 with respect to the lorry 1 in the transport position. On the rigid arm 209 there is arranged a cross member 230 which carries a pair of standard female abutments adapted to cooperate with a pair of standard male abutments 231 arranged on the lower face of the load 4, with the male abutments 231 penetrating into the female abutments until they come to a stop on the cross member 230 when the apparatus 203 passes from the position for start or finish of tilting (FIG. 2) to the transport position (FIG. 1). It is the cross member 230 and the abutments 231 that determine the instant at which the ram of the jib jack 219 is extended far enough for the transport position to have been achieved, the abutments 231 being arranged in a predetermined location with respect to the foreseeable position of the center of gravity of the load 4.

Stiffening as between the rigid arm 209 and jib 208 is obtained by virtue of the stiffness of the load 4 and the fact that the rigid arm 209 is in engagement with the latter through the standard abutments, and in engagement with the jib 208 through the lifting hook 221 which is engaged in the eye 5.

Figure 8:
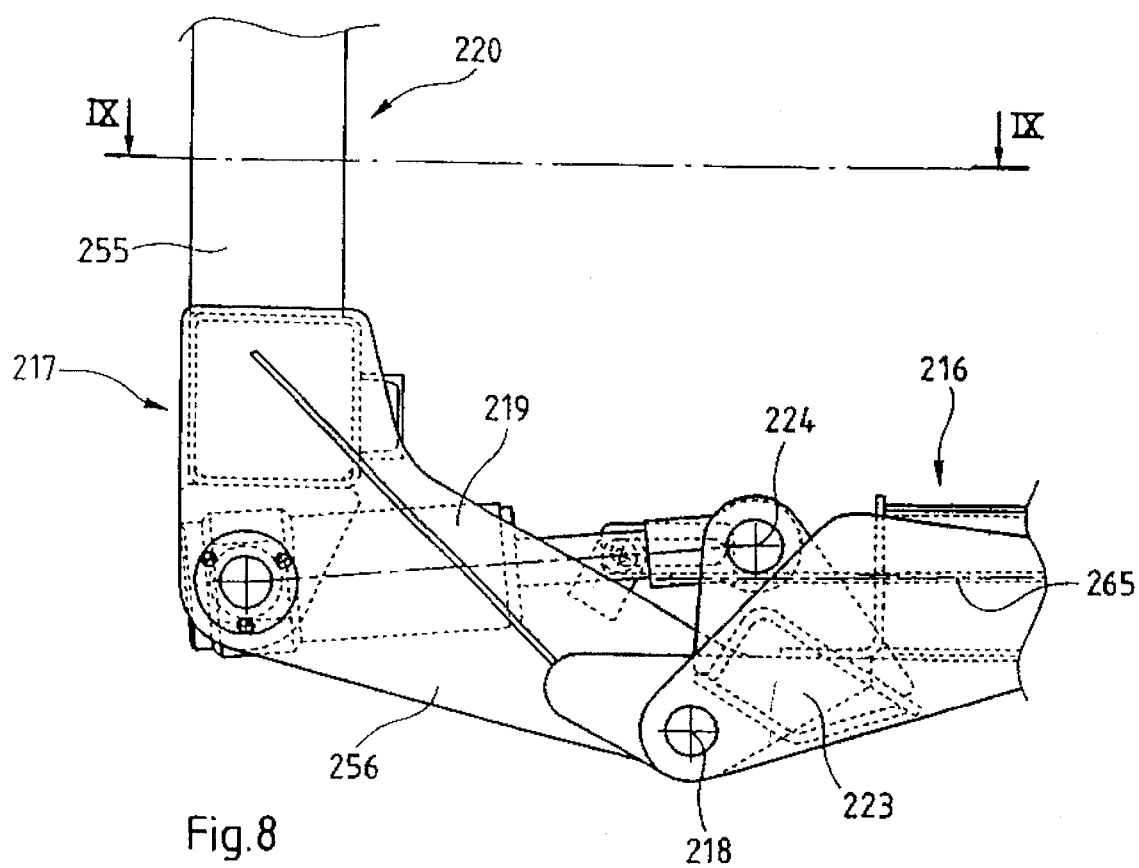
FIG. 8 shows in greater detail the coupling between the support beam and the fork of the jib of the apparatus.
Figure 9:
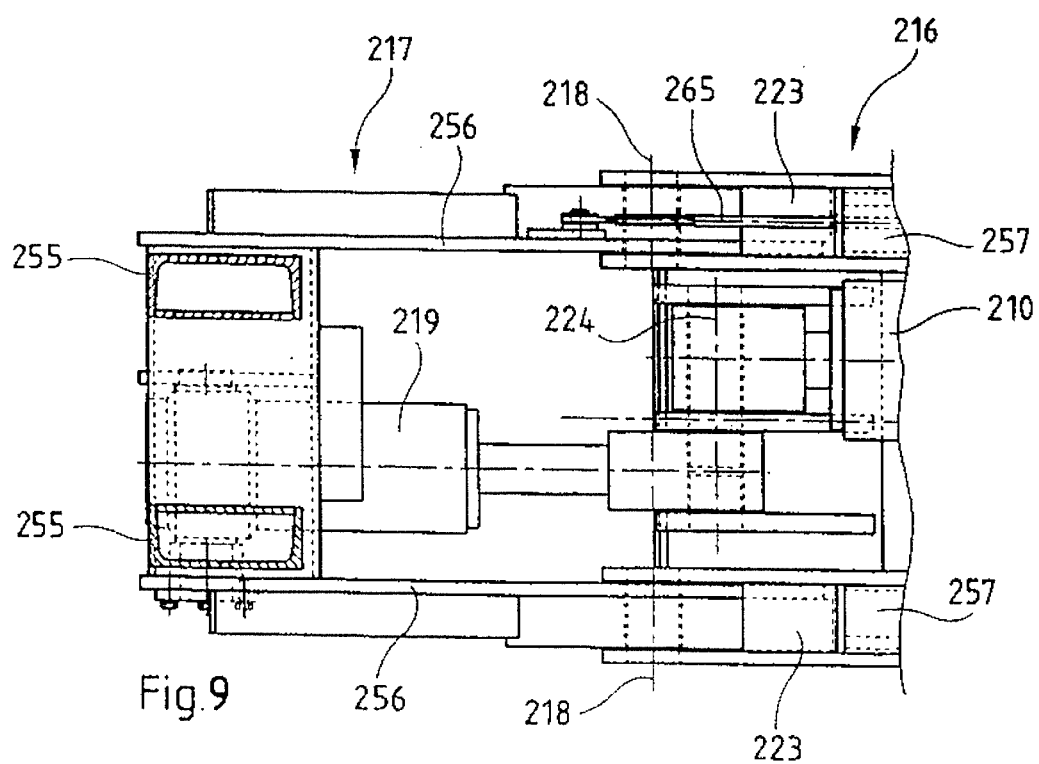
FIG. 9 is a cross-sectional view taken along line IX—IX in FIG. 8.

Alternatively, it is possible to obtain this stiffening effect by the use of one hook or two, as described below with reference to FIGS. 8 to 10.

Figure 10:
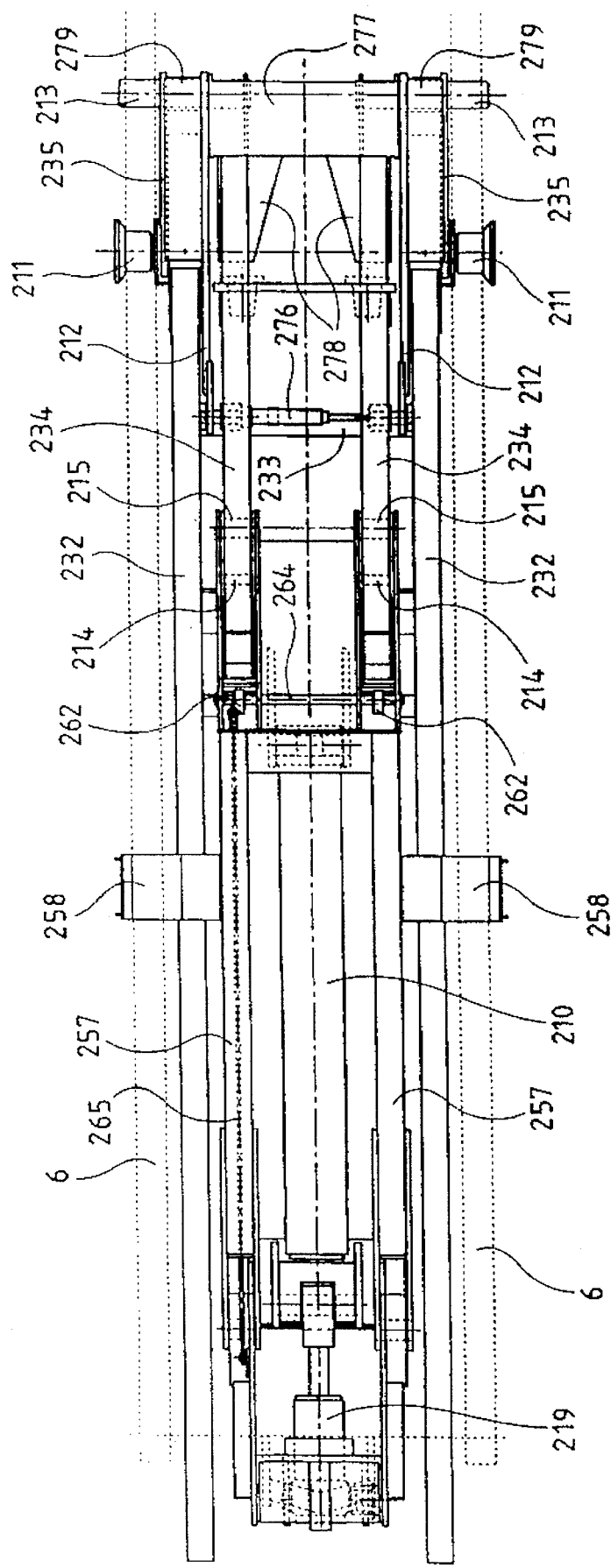
FIG. 10 is a plan view of the same apparatus in the transport position, but with the actuating mechanism for the immobilizing fingers of the levers 212 which have been replaced by a jack, while the tilting and jib jacks are in aligned relationship with each other, instead of being non-aligned.

As can be seen in FIG. 10, the frame 207 has two longitudinal members 232 (on the right- and left-hand sides respectively), and a horizontal plate 233 which is disposed between the longitudinal members 232, at the rear and at the same level as their base. The rigid arm 209 itself also includes two longitudinal members 234 on the right- and left-hand sides, respectively, which are disposed between the longitudinal members 232.

Each lever 212 is contiguous at the inner side of one of the longitudinal members 232 of the frame 207, and is partially replicated by a complementary lever 235 which is contiguous on an outer side with that longitudinal member. Each complementary lever 235 is articulated at the rear in the same way as the lever 212 which it replicates, and it is also articulated on the transverse trunnion on which the roller 211 is rotatably mounted, though it is not extended forward beyond that articulation.

In the apparatus 203, the immobilizing means is able to act so as to immobilize the levers 212 with respect to the frame 207, and therefore to immobilize the articulation between these and the rigid arm 209 in the position of this articulation in FIGS. 1 and 5. The immobilizing means embody, for each lever 212, an immobilizing member 236 which is coupled to the frame and which is movable with respect to the latter between a retracted position (FIGS. 2 to 4) and an extended position (FIGS. 1 and 5). The immobilizing member 236 in this example is a finger which is mounted for sliding movement in a fixed guide on the plate 233, the finger 236 being adapted to engage also in a hole of the longitudinal member 232 when it passes from the extended position to the retracted position.

As can be seen in particular in FIGS. 1 and 5, the front end of the lever 212 makes contact with the plate 233 when the rigid arm 209 is raised, and it is in this position that the finger 236 is arranged to pass from the retracted position to the extended position or vice versa, the lever 212 having a hole in the corresponding location.

In the apparatus 203 (except in the case of FIG. 10), the actuating means for the immobilizing member 236, which operate so as to cause it to pass from the retracted position to the extended position or vice versa, embody a mechanism which is adapted to be driven between the position for start or finish of tilting (FIG. 2) and the transport position (FIG. 1) by one of the male abutments 231. This mechanism in turn drives the immobilizing member 236 between the extended position and the retracted position.

Thus, the immobilizing means for the levers 212 are automatically activated when the tilting structure passes from the position for start or finish of tilting to the transport position, and vice versa.

It will be noted that the stiffening means for the tilting structure of the apparatus 203 are also activated or deactivated between the same positions.

The vertical arm 220 of the fork 217 has, when seen from the front, the shape of an inverted V, branches 255 of which are joined at the top at the level of the lifting hook 221, while at the bottom each of them is joined to a transverse beam carried by two longitudinal plates 256, on the right- and left-hand sides, respectively, between which the jib jack 219 is arranged, with each of the longitudinal plates 256 being pivoted about the deformation axis 218 on a respective right- or left-hand longitudinal member 257 of the support beam 216, the tilting jack 210 being disposed between these longitudinal members 257.

As can be seen best in FIG. 10, each of the longitudinal members 257 carries a support 258 which extends transversely outwards. The supports 258 serve, through their lower face, to define a support means in the transport position between the support beam 216 and the longitudinal members 232 of the frame 207, and through their upper face to provide support and centering for the longitudinal rails 6 of the load 4 (see FIGS. 1 and 2).

It will be noted (see FIG. 10) that each of the first and second articulating members 214 and 215 is formed in two portions on the right- and left-hand sides, respectively, carried by the longitudinal members 234.

With a view to completing, or even replacing, the stiffening, as between the support beam 216 and the rigid arm 209, that is obtained through the cooperation between the male abutments 231 and the female abutments of the cross member 230, the support beam 216 of the apparatus shown in FIGS. 1 to 10 has at the front a hook 262 (FIG. 10) which is movable between a stiffening position in which it is engaged with the front end of one of the longitudinal members 234 of the arm 209, so that the jib 208 is unable to pivot with respect to the arm 209, and an unlocking position which the hook reaches by tilting in such a way that its lower part becomes disengaged from the front of the longitudinal member 234, which leaves the jib 208 free to pivot with respect to the arm 209 about the central axis of the second articulating member 215. The two hooks 262 are connected together by means of a bar 264 whereby they are rotatably mounted, and they are driven by a rod 265, one end of which is pivoted to the hook 262 lying on the right-hand side of the apparatus, while its other end is pivoted on the fork 217, and more precisely on the right-hand plate 256, with the rod 265 passing within the right-hand longitudinal member 257.

The hooks 262 are in their stiffening position when the ram of the jib jack 219 is extended, that is to say when the apparatus is in the transport position, and when the ram of the jib jack 219 retracts, the pivoting movement of the fork 217 about the deformation axis 218 drives the rod 265 in the direction in which it causes the hooks 262 to pass into the unlocking position.

It will be seen that, in addition, the stiffening means as between the jib 208 and the arm 209 are activated automatically when the apparatus passes from the position for starting or finishing tilting to the transport position.

Besides the longitudinal members 232 and the rear or horizontal plate 233, the frame 207 includes a cross piece 266 (FIGS. 1, 6 and 7) which is situated just in front of the rear wheels of the vehicle 1, with two vertical flanges 270 being arranged for the mounting of the tilting jack 210 for rotation about the second transverse jack axis 225, while at the location to which each of the longitudinal members 234 of the rigid arm 209 extends, underneath, there is a nib 273, arranged to cooperate with a catch 274 which is included in each of these longitudinal members (see below).

In the apparatus of FIG. 10, the actuating means for the immobilizing members or fingers 236 consist of a pneumatic actuator 276, at each end of which one of the fingers 236 is fixed. The actuator 276 may be controlled by an operator in order to engage the fingers 236 in the levers 212 when the apparatus is in the transport position. The action of the actuator 276 then enables a tipping operation to be carried out by actuation of the tilting jack 210. It is also possible to provide a detector for the automatic actuation, as described above, of the actuator 276 when the apparatus reaches the transport position, and conversely when the apparatus leaves the transport position.

As can be seen in FIG. 10, the rigid arm 209 includes, behind the longitudinal members 234, transverse profiled members 277 which join the longitudinal members together, with triangular plates 278 being arranged between the longitudinal members 234 and the profiled members 277 for stiffening the arm 209. The profiled members 277 extend backwards beyond the rear end of the frame 207, and they carry a third articulating member 279, which in this example is constituted for reasons of economy by two portions, on the left- and right-hand sides, respectively, having a transverse central axis which, when the apparatus is in the transport position, is coincident with the articulation axis 280 (FIG. 5) about which the structure 208 and 209, with the skip 4, pivot when the apparatus passes from the transport position to the tipping position. Conversely, when the apparatus passes from the position for starting or finishing tilting to the position for changing the articulating member, the third articulating member is lowered to a position in which it remains when the rigid arm is held to the frame between the position for changing the articulating member and the pick up or set down position.

Each of the levers 212 and 235 is pivoted with respect to the rigid arm 209, being pivoted about the third articulating member 279.

The transverse support members 213 are secured to the rigid arm 209 coaxially with the third articulating member 279. It will be observed (see FIG. 1) that the portion of the roller 211 which is in contact with the rail 6 of the load 4 is at or close to the level of that portion of the transverse support member 213 which is in contact with that rail 6.

In this connection it will be noted that the apparatus 203 has rear engagement points for the load 4, which are different during picking up or setting down operations from those in tipping operations. In the last mentioned operation, the engagement points are defined by the transverse support members 213, while during pick up or set down operations, it is the rollers 211 that define the engagement points, the apparatus being arranged in such a way that the lowering of the transverse support members 213, between the position for starting or finishing tilting (FIG. 2) and the position for changing the articulating member (FIG. 3), puts them outside the path which is followed by the rails 6 between the pick up or set down position (FIG. 4) and the position for changing the articulating member.

The reason for having different application points is that it is possible to locate those which are applicable during pick up or set down operations (the rollers 211) far enough forward to limit their cantilever arm with respect to the rear axle of the vehicle 1, and to limit the inclination assumed by the load 4. The advantage of limiting the cantilever arm lies in avoiding the danger of the vehicle bucking during a picking up or setting down operation, while the advantage of limiting the inclination of the load during a picking up or setting down operation is that the contents of the skip are prevented from spilling over its rear side, while also, the load can be picked up from, or put down on, the ground without being raised very high, which would prevent any such maneuver in a hangar.

The reason for locating the engagement means which are operable during tipping (the support members 213) both as far back and as high as possible, is to enable particularly large tipping angles to be attained (see FIG. 5) without there being any danger that the lower rear edge of the load will meet either the ground or anything that has previously been spilt through the rear door of the load if this has been previously opened.

It will be noted that the levers 212, being arranged to be hooked on to the frame 207, are particularly suitable means for immobilizing the third articulating members 279 in a position in which their central axis is coincident with the tilting axis 280, though it is possible in a modification to make use of other immobilizing means, for example an actuator which is secured vertically to the frame 207, and the ram of which, when extended, prevents the rigid arm 209 from being lowered towards the frame 207, while when it is retracted, the arm 209 is able to be lowered freely until it meets the frame 207.

It will be observed that, due to the fact that the levers 235 are not extended forward beyond their articulation on the same trunnion as that of the rollers 211, the center of gravity of the assembly 212 and 235 is behind the axis of the trunnion. In consequence, the assembly constituted by the levers 212 and 235 exerts, due to its own weight, a force which is directed downwardly behind the rigid arm 209. The latter thus tends to be lowered spontaneously, which assists the structure 208 and 209 to remain inflexible between the position for starting or finishing tilting (FIG. 2) and the position for changing the articulating member (FIG. 3).

The rigid arm 209 includes a first abutment means and a second abutment means which lie at the front and rear, respectively, for cooperation with the support beam 216 and the frame 207, respectively.

The first abutment means (see in particular FIGS. 6 and 7) is a flat element 283 which is horizontal or nearly horizontal in the transport position (FIG. 1), and which is arranged to cooperate with an abutment means of the support beam 216, so arranged that the latter is free to pivot towards the rear with respect to the rigid arm 209, while it comes into contact with the flat element 283 in order to prevent the jib 208 from pivoting forward with respect to the rigid arm beyond the substantially aligned position which is assumed by the rigid arm and the beam 216 in the position for changing the articulating member. The abutment means for the support beam 216 in this example is a plate 284 which is vertical or nearly vertical in the transport position, and which makes contact with the flat element 283 through its narrow lower face. It will be noted that the point of contact between the flat element 283 and the plate 284 lies entirely in front of the arm 209, and is therefore also spaced as far as possible away from the second articulating member 215. The second abutment means which is included in the rigid arm 209 at the rear (see FIG. 10) is defined by the underneath of the profiled members 277 which make contact with the horizontal plate 233 of the frame 207 in the position for changing the articulating member.

It will be observed that the provision of the second abutment means of the arm 209 at the extreme rear of the latter offers firstly the advantage of maximizing the rotational travel between the position for starting or finishing tilting and the position for changing the articulating member, and secondly the advantage of minimizing the force exerted on the nib 273 when it is holding the arm 209 in engagement on the frame 207, that is to say between the position in which the first transverse jack axis 224 and the first and second transverse tilting axes 226 and 227 are coplanar and the position for picking up and setting down, as will be explained below.

The engagement means with which the frame 207 is provided for the first and second articulating members 214 and 215, so that the changeover between the axes 226 and 227 can be achieved, embody the horizontal plate 233 which serves as an abutment means for the abutment means defined by the underneath of the profiled members 277 of the arm 209; the nibs 273 under which the catches 274 of the arm 209 become engaged when the apparatus passes from the position for starting or finishing tilting (FIG. 2) to the position for changing the articulating member (FIG. 3), and vice versa; and the flats 420 which act as means for holding the first articulating member 214 in engagement.

The torque which is exerted by the tilting jack 210 on the rigid arm 209 changes direction in the position in which the first and second transverse tilting axes 226 and 227 are coplanar with the first transverse jack axis 224. In this connection, the rigid arm 209 is held down on the frame 207:

between the position for changing the articulating member (FIG. 3) and the above mentioned position, due to the reaction force exerted by the flat 420 on the first articulating member 214 and to the reaction force exerted by the horizontal plate 233 on the underside of the profiled members 277 of the arm 209, since the torque which is exerted by the tilting jack 210 is in the same direction as that in which the arm 209 pivots in going from the position for starting or finishing tilting (FIG. 2) to the position for changing the articulating member (FIG. 3); and between the above mentioned position and the pick up or set down position (FIG. 4), due to the reaction forces exerted by the horizontal plate 233 on the underside of the profiled members 277, and due to the reaction force which is exerted by the nib 273 on the catch 274, and also due to the engagement by contact of these last mentioned elements, the engagement of the catch 274 with the nib 273 being assured by the freedom which the flat 420 allows to the first articulating member 214.

In this connection, it will be noted that a lower face 286 of the nib 273, with which the catch 274 makes contact, is at right angles to a straight line which joins the first transverse tilting axis 226 to the center of the lower face 286.

In a modification not shown, in order to prevent any sliding movement between the nib 273 and the catch 274, since they must remain held together, inter-engagement means are provided, and in particular small transverse grooves on the lower face 286 in which small ribs provided on an upper face 287 of the catch 274 are engaged.

Each lever 212 is pivoted through a bearing, without clearance, on a trunnion 421 on which the roller 211 lying on the same side as that lever is rotatably mounted, while the first articulating member 214 is able to slide along the flat 420 between the position for starting or finishing tilting (FIGS. 2 and 6) and the position for changing the articulating member (FIGS. 3 and 7).

More precisely, the first articulating member 214 slides on the flat 420 by advancing along the latter from the position for starting or finishing tilting to the position for changing the articulating member: given that the lever 212 is mounted rotatably on the trunnion 421, its rear end, which is rotatably mounted on the rigid arm 209, then describes an arc of a circle centered on the central axis of the trunnion 421, and therefore goes, from the position for starting or finishing tilting to the position for changing the articulating member, in a slight advancing movement while being lowered at the same time, and the rigid arm 209, being articulated at the rear end of the levers 212, then also itself advances slightly, while the first articulating member 214 slides on the flat 420.

It will be observed that the central axis of the second articulating member 215 lies, at any time between the position for starting or finishing tilting (FIG. 3) and the position for changing the articulating member (FIG. 4), above the line of the axis of the tilting jack 210, which passes through the first and second transverse jack axes 224 and 225. Under these conditions, the support beam 216 is subjected by the tilting jack 210 to a force having a first component orientated in the direction passing through the first transverse jack axis 224 and through the central axis of the second articulating member 215, and a second, downward, component. The first component is taken by the arm 209 at the level of the second articulating member 215, while the second component is taken by the frame 207 at the level of the first articulating member 214, given that the support beam 216 and the arm 209 then constitute an inflexible assembly. It is the second component, directed downwardly, which causes the first articulating member 214 to remain seated on the flat 420 between the position for starting or finishing tilting and the position for changing the articulating member.

It will also be observed that the central axis of the third articulating member 279, that is to say the pivot axis between the arm 209 and the levers 212, remains, between the above mentioned positions, below the plane that passes through the central axis of the second articulating member 215 and the central axis of the trunnion 421, including the position for starting or finishing tilting (FIG. 2). This enables the force which is exerted on the arm 209 at the level of the second articulating member 215 to bias the rear end of the lever 212 so as to cause it to be lowered from the position for starting or finishing tilting to the position for changing the articulating member, and so as to cause it to be raised in the opposite direction. If by contrast the pivot axis between the arm 209 and the levers 212 were above the above mentioned plane in the position for starting or finishing tilting, the levers 212 would be biased in the wrong direction, and the apparatus 203 would remain blocked in that position.

Figure 11:
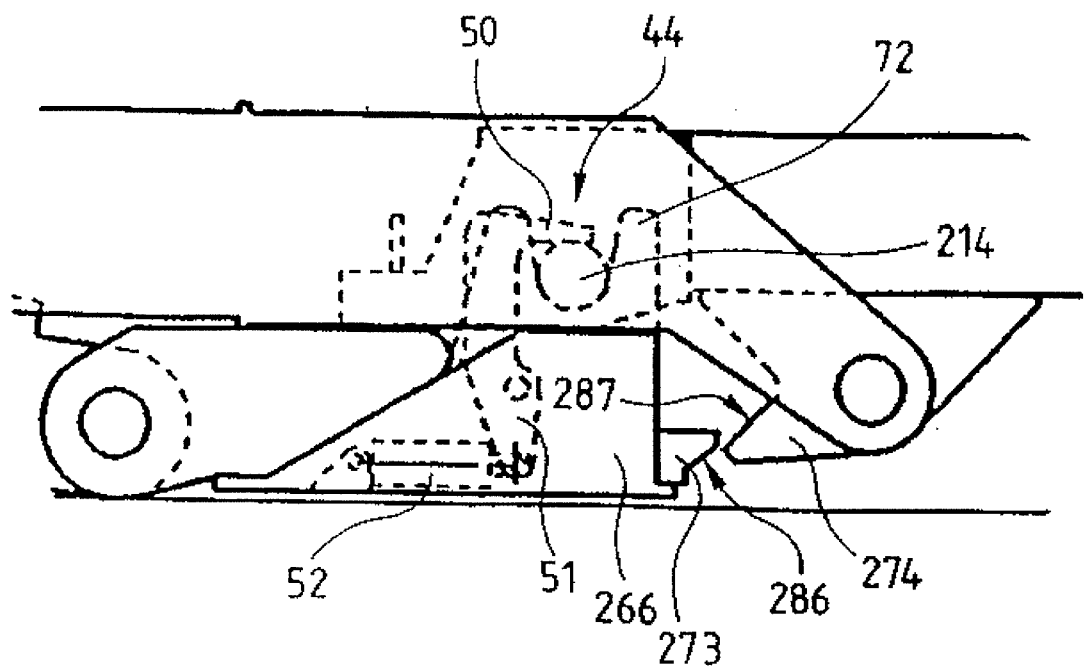
FIG. 11 is a view similar to FIG. 6, showing a modified embodiment of the invention.
Figure 12:
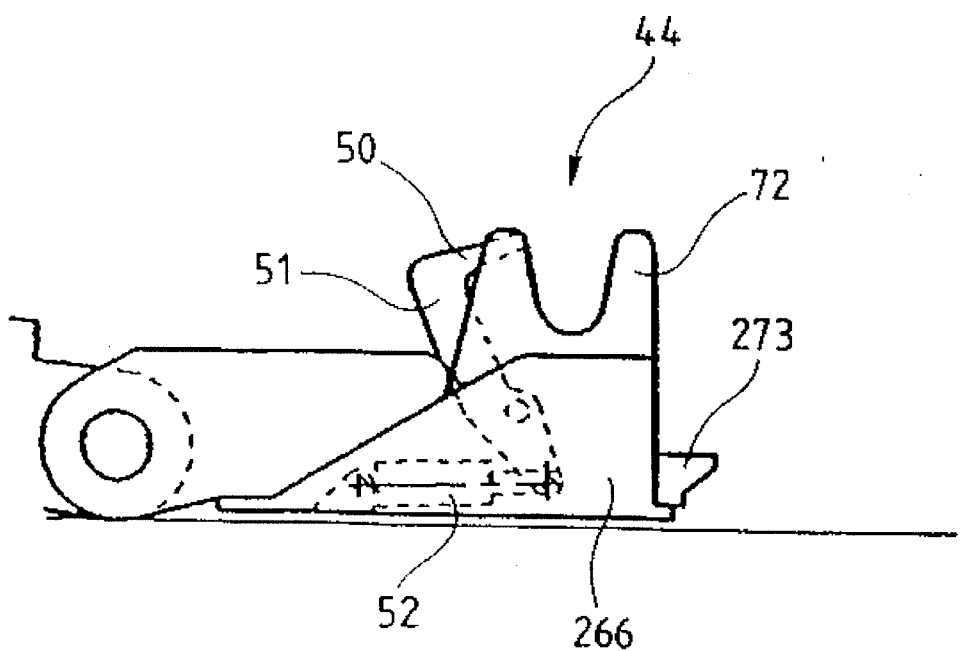
FIG. 12 shows the configuration of the apparatus in the tipping position according to the modified embodiment of FIG. 11.

In the modified embodiment shown in FIGS. 11 and 12, the flat 420 is replaced with a V-shaped groove 44, the base of which has the same rounded profile as that of the first articulating member 214, the groove 44 being defined in a fork element 72, with the engagement means of the frame 207 also including a movable finger 50 which is part of a hook 51, the finger 50 being capable of being displaced between the position of FIG. 12, in which the groove 44 is open upwardly so that the first articulating member 214 is free to move into or out of it, and the position of FIG. 11 in which the groove 44 is closed by the first articulating member 214 which is held in position in it. In order to actuate the movable finger, a small actuator is provided, which in this example is a pneumatic actuator 52 having its ram retracted in the position of FIG. 11 and extended in the position of FIG. 12.

The fork elements 72 are adapted to hold the first articulating member 214 with its central axis coincident with the first transverse tilting axis 226 between the position for starting or finishing tilting (FIG. 2) and the position for changing the articulating member (FIG. 3).

Figure 6:
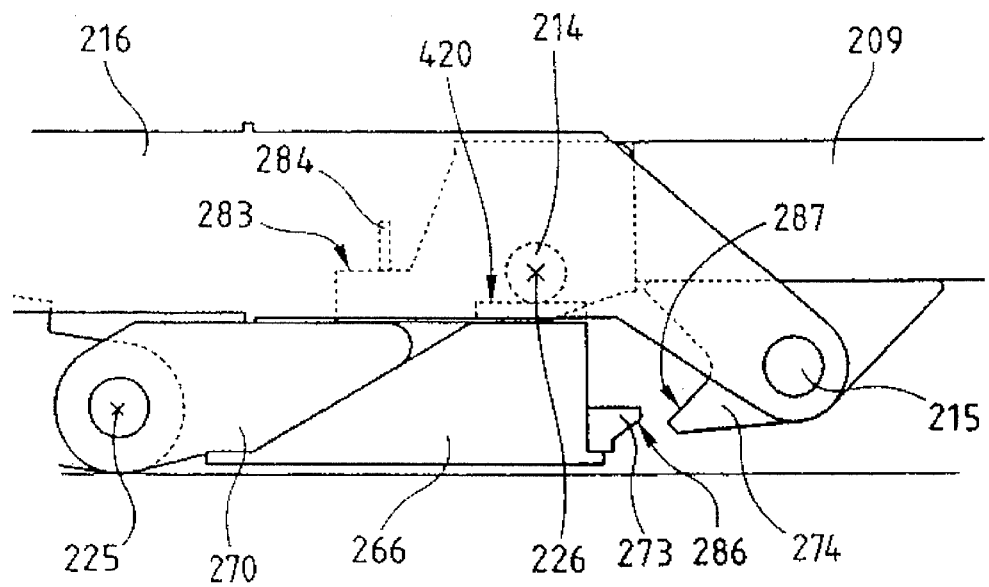
FIGS. 6 and 7 are enlarged views of the parts of FIG. 2 and the parts of FIG. 3, respectively, that are situated in the vicinity of the cross member of the frame.

Instead of being pivoted without any clearance on the trunnion 421, each lever 212 is engaged on the trunnion by means of a longitudinally orientated oblong hole so as to permit the operation of the apparatus, although the first articulating member 214 cannot be displaced longitudinally as shown in FIGS. 6 and 7.

Figure 13:
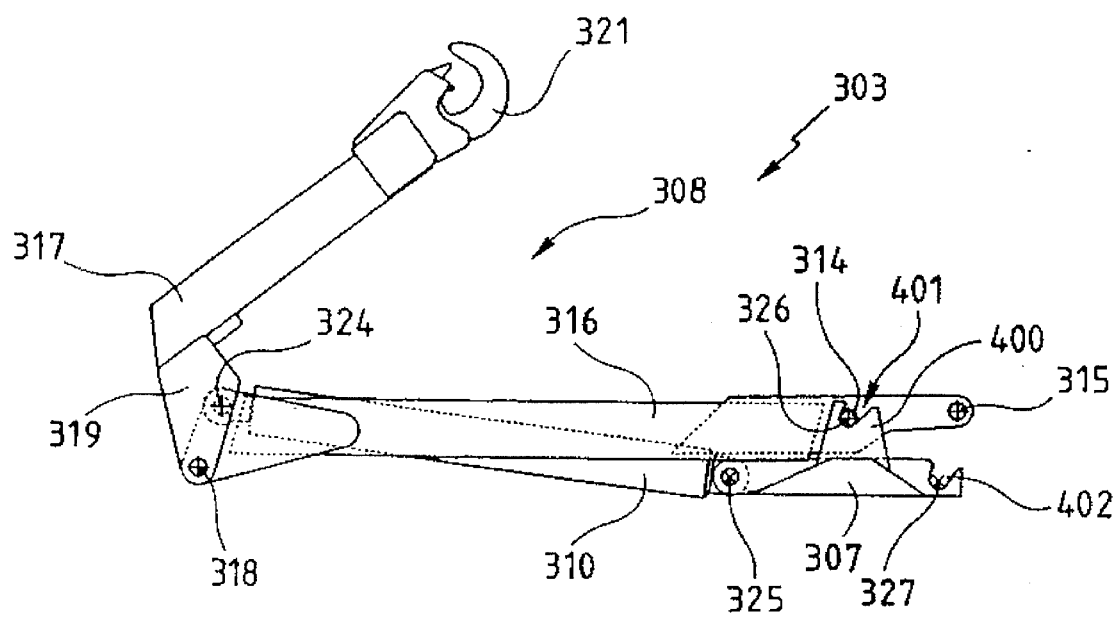
FIGS. 13 and 14 are diagrammatic views showing, in a similar way to FIGS. 2 and 3, a modified embodiment of the apparatus.
Figure 16:
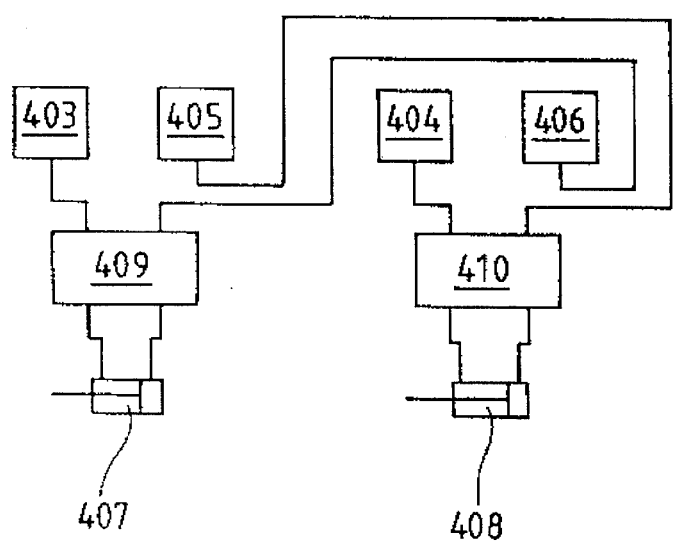
FIG. 16 is a diagrammatic view of the actuating means for a mobile finger, which forms part of the means for holding by engagement with which the frame is provided.

The apparatus shown in FIGS. 13 and 16 does not permit tipping operations to be carried out. Those elements that are similar to those of the apparatuses described with reference to FIGS. 1 to 10 carry corresponding reference numerals to which 100 has been added.

Figure 14:
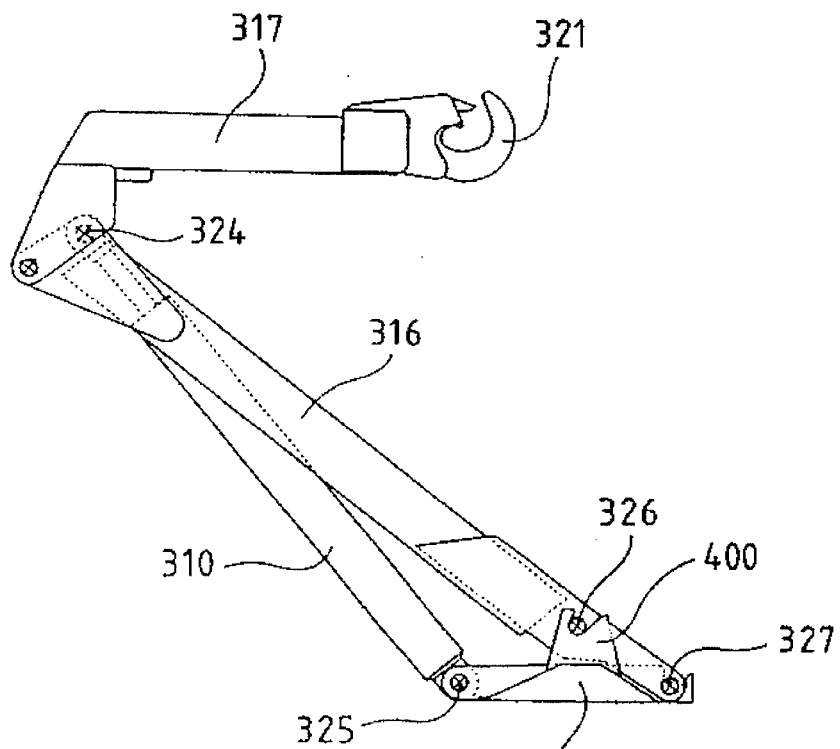
Figure 15:
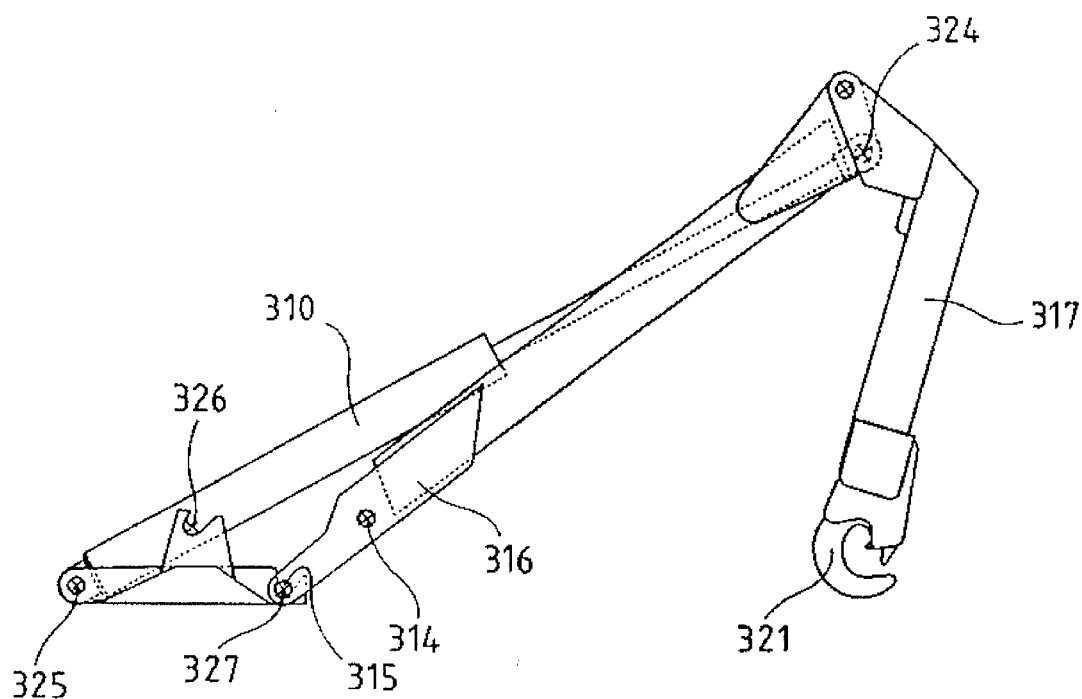
FIG. 15 is a similar view of the same, in the pick up or set down position.

By contrast with the apparatus 203, the tilting structure of the apparatus 303 is inflexible under the effect of the tilting jack between the position for starting or finishing tilting (FIG. 13) and the pick up or set down position (FIG. 15), that is to say during the whole of the tilting movement, with the engagement means for the first and second articulating members 314 and 315, with which the frame 307 is provided, being adapted to leave the first articulating member 314 free to pivot with respect to the frame about the second transverse tilting axis 327, between the position for changing the articulating member (FIG. 14) and the pick up or set down position: in this example, the rigid arm is part of the jib 308 and is defined by the support beam 316.

More precisely, the engagement means with which the frame is provided embody for the first articulating member 314, a groove 401, defined by a fork 400, and adapted to receive the first articulating member 314 and to support it in a position in which its central axis is coincident with the corresponding first transverse tilting axis 326; a finger, not shown in FIGS. 13 to 16 but similar to the finger 50 (FIGS. 11 and 12), which is movable between a position in which the groove 401 is open, with the first articulating member 314 being free to enter or leave it, and a position in which the groove 401 is closed by the first articulating member 314, which is held in position in it; together with actuating means for this movable finger.

The engagement means with which the frame 307 is provided have, in a similar way, a groove 402 for the second articulating member 315.

The actuating means for the movable finger of the groove 401 are adapted to actuate it in order to close the groove 401 when the first articulating member 314 is positioned therein, and to actuate it so as to open the groove 401 when the movable finger of the groove 402 closes the latter.

As is shown diagrammatically in FIG. 16, the actuating means for the movable finger of the groove 401, and for that of the groove 402, each embody a proximity detector, 403 and 404, respectively, for detecting whether the articulating member is or is not in place in its groove; a closure detector, 405 and 406, respectively, for detecting whether the movable finger is or is not closing its groove; and an actuator which is coupled mechanically to the movable finger and connected to the proximity detector for the groove of the articulating member and to the closure detector for the groove of the other articulating member.

Each actuator in this example has a jack 407 and 408, respectively, controlled by a control unit, 409 and 410, respectively, which is connected to the detector for the proximity of its groove and to the detector for closure of the other groove.

It will be noted that in each of the embodiments, the distance between the first transverse tilting axis 226 or 326 and the second transverse tilting axis 227 or 327 is of the order of 10 to 15% of the distance between the lifting hook 221 or 321 and the first tilting axis between the position for starting or finishing tilting and the position for changing the articulating member, that is to say the radius of pivoting of the lifting hook between these two positions.

This enables the engagement means for the first and second articulating members to be placed on a common cross member of the frame, which is advantageous in terms of manufacturing. Generally speaking, this advantage should be capable of being retained so long as the above mentioned ratio remains smaller than 20%.

It will also be observed that the angle through which the lifting hook tilts about the first transverse tilting axis 226 or 326 between the position for starting or finishing tilting and the position for changing the articulating member is very much smaller than the angle through which the hook tilts about the second transverse tilting axis 227 or 327 between the position for changing the articulating member and the pick up or set down position.

In this connection, having regard to the foregoing, it is necessary for the tilting angle about the first tilting axis to be relatively small: it is of the order of 10 to 35 degrees in the examples shown, and should remain less than 40 degrees.

Finally, in modified embodiments not shown, in which the load 4 is particularly long, the support beam 216 or 316 is telescopic instead of having a fixed length.

It will be apparent to one skilled in the art that the invention is not limited to the examples described and shown and that various modifications may be made without departing from the scope of the claims appended hereto.

What is claimed is:

1. Apparatus for enabling a vehicle having a chassis to pick up or put down on a ground surface a load having a front face, a lower face, a lifting eye located on said front face and two longitudinal rails, each said rail being situated respectively on a right-hand and a left-hand side of said lower face of said load, said apparatus comprising:

a frame fixed on said chassis of said vehicle;

a tilting manipulating structure having a first end and a second end mounted with respect to said frame, said tilting manipulating structure comprising:

a hook located at said first end of said tilting manipulating structure for communicating with said lifting eye of said load;

a first articulating member connected to said tilting manipulating structure and disposed proximate said chassis of said vehicle and defining a first tilting axis for said hook; and a second articulating member connected to said tilting manipulating structure and defining a second tilting axis for said hook, said tilting manipulating structure defining a pick up or set down position in which said hook is behind said vehicle at a height at which said hook can engage with, or be released from, said lifting eye of said load positioned on said ground surface, and a transport position in which said tilting manipulating structure has at said first end a substantially vertical portion; and a tilting jack having a first end connected to said tilting manipulating structure and a second end connected to said vehicle for tilting said tilting manipulating structure between said pick up or set down position and a position for starting or finishing tilting, said tilting jack having a first transverse jack axis on said tilting manipulating structure and a second transverse jack axis fixedly mounted on said vehicle, said tilting manipulating structure contacting said frame to define a position for changing from said first articulating member to said second articulating member such that said hook pivots about said first tilting axis between said position for starting or finishing tilting and said position for changing, and about said second tilting axis between said position for changing and said pick up or set down position;

wherein said tilting jack is articulated on said tilting manipulating structure about said first transverse jack axis which, in said position for starting or finishing tilting, is located in front of and above said second transverse jack axis about which said tilting jack is articulated and when said tilting manipulating structure is located in said pick up or set down position said first transverse jack axis is located above and behind said second transverse jack axis.

2. Apparatus according to claim 1 wherein when said tilting manipulating structure is located in said position for starting or finishing tilting, said first tilting axis, defined by said first articulating member, is located above and behind said second transverse jack axis and said first transverse jack axis is above said second transverse jack axis.

3. Apparatus according to claim 1 wherein when said tilting manipulating structure is located in said pick up or set down position, said second tilting axis is below and behind said first tilting axis and when said tilting manipulating structure is situated in said position for starting or finishing tilting, said first transverse jack axis is located above said second transverse jack axis.

4. Apparatus according to claim 1 wherein said tilting manipulating structure includes a jib movable between a transport position and said position for starting or finishing tilting such that said load can be withdrawn on to or advanced from said vehicle, said jib comprising:

a support beam having a front end, said support beam aligned substantially horizontal with said frame in said transport position and located substantially proximate said frame, said support beam tilting rearwardly about said first and said second tilting axis and comprising articulating means about which said tilting jack is articulated on said support beam about said first transverse jack axis;

a fork including said substantially vertical portion of said tilting manipulating structure, said fork articulated to said front end of said support beam about a transverse deformation axis; and a jib jack for pivoting said fork with respect to said support beam about said deformation axis, said jib jack operable between said transport position and said position for starting or finishing tilting.

5. Apparatus according to claim 4 wherein said fork has a nose situated behind said deformation axis in said transport position and engaging said vehicle when said jib is located in said position for starting or finishing tilting, whereby said first transverse jack axis is slightly raised from said transport position to reach said position for starting or finishing tilting.

6. Apparatus according to claim 4 wherein said tilting manipulating structure includes a rigid arm having located thereon said first and second articulating members, said rigid arm being substantially inflexible under a force exerted by said tilting jack between said position for starting or finishing tilting and said position for changing said articulating member; and said frame further comprising engagement means for engagement with said first and second articulating members of said rigid arm, said first articulating member engaging said frame at least between said position for starting or finishing tilting and said position for changing, during which said second articulating member pivots with respect to said frame, said second articulating member engaging said frame between said position for changing and said pick up or set down position.

7. Apparatus according to claim 6 wherein said engagement means is adapted to allow said first articulating member to pivot with respect to said frame about said second tilting axis between said position for changing said articulating member and said pick up or set down position, said tilting structure being adapted to remain inflexible between said position for changing said articulating member and said pick up or set down position.

8. Apparatus according to claim 7 wherein said rigid arm is defined by said support beam.

9. Apparatus according to claim 7 wherein said engagement means, for each of said first and second articulating members, comprises:

a groove adapted to receive and support said engagement means;

a finger connected to said groove, said finger being movable between a first position in which said groove is open with said articulating member being free to enter or leave it, and a second position in which said groove is closed with said articulating member being retained in place therein; and actuating means connected to said movable finger for closing said groove when said articulating member is put in position therein, and for opening said groove.

10. Apparatus according to claim 9 wherein said actuating means for each of said first and second articulating members comprises:

a proximity detector for detecting whether said articulating member is in place in said groove;

a closure detector for detecting whether said movable finger closes said groove; and an actuator mechanically coupled to said movable finger and connected to said proximity detector and said closure detector.

11. Apparatus according to claim 10 wherein each said actuator comprises a jack controlled by a control unit which is connected to said proximity detector and to said closure detector.

12. Apparatus according to claim 6 wherein said engagement means maintains said rigid arm in position on said frame between said position for changing and said pick up or set down position, and wherein said tilting manipulating structure pivots with respect to said rigid arm about said second tilting axis.

13. Apparatus according to claim 12 wherein said tilting manipulating structure further includes a support beam comprising:

means for rotatably mounting said rigid arm with respect to said frame, said mounting means cooperating with said second articulating member and said support beam is articulated with respect to said rigid arm about said second tilting axis of said second articulating member; and abutment means disposed on said rigid arm, said support beam being pivotable rearwardly with respect to said rigid arm and said abutment means of said rigid arm prevents said support beam for pivoting forward with respect to said right arm beyond a predetermined position.

14. Apparatus according to claim 13 wherein said rigid arm includes a rear end having a second abutment means contacting said frame between said position for starting or finishing tilting and said position for changing.

15. Apparatus according to claim 13 wherein said engagement means comprises:

a nib connected to said frame;

a catch connected to said rigid arm and in facing relationship with said nib from said position for starting or finishing tilting to said position for changing; and an engagement member located between said first articulating member and said frame and adapted to support said first articulating member.

16. Apparatus according to claim 12 further comprising:

a third articulating member located at a rear of said rigid arm located at a rear of said vehicle and defining a third tilting axis;

immobilizing means connected to said frame which act to immobilize said third articulating member with respect to said frame; and stiffening means for preventing said support beam from pivoting with respect to said rigid arm, whereby said tilting manipulating structure is inflexible under the force exerted by said tilting jack;

whereby said first articulating member pivots with respect to said frame about said third tilting axis and said tilting jack causes said tilting manipulating structure to pivot about said third tilting axis.

17. Apparatus according to claim 16 further comprising a support member fixed with respect to said rigid arm and coaxially with said third articulating member to retain said load on said apparatus.

18. Apparatus according to claim 17, further comprising a roller mounted rotatably on said frame in front of said third articulating member, said roller such that said rail bears and rolls thereon during operation.

19. Apparatus according to claim 17 wherein said immobilizing means comprises:

a transverse trunnion fixed to said frame;

at least one lever articulated at a rear of said third articulating member, said at least one lever articulating on said transverse trunnion and extending forward beyond said transverse trunnion;

an immobilizing member coupled to said frame between a retracted position and an extended position to immobilize said at least one lever with respect to said frame; and means for actuating said immobilizing member connected to said frame for causing said immobilizing member to pass from said retracted position to said extended position.

20. Apparatus according to claim 16 further comprising means for automatically activating said immobilizing means when said tilting manipulating structure passes from said position for starting or finishing tilting to said transport position.

21. Apparatus according to claim 20 wherein said activating means comprise a male positioning abutment arranged on said lower face of said load for driving said immobilizing member between said extended position and said retracted position.

22. Apparatus according to claim 16 further comprising means for automatically activating said stiffening means when said tilting manipulating structure passes from said position for starting and finishing tilting to said transport position.

23. Apparatus according to claim 1 wherein the distance between said first articulating member and said second articulating member is less than 20% of the distance between said hook and said first articulating member, in said position for starting or finishing tilting.

* * * * *

UNITED STATES PATENT AND TRADEMARK OFFICE
CERTIFICATE OF CORRECTION

PATENT NO. : 5,542,808
DATED : August 6, 1996
INVENTOR(S) : Chiron et al

It is certified that error appears in the above-indentified patent and that said Letters Patent is hereby corrected as shown below:

Column 5, line 54, delete "transparent" insert ---- transport ----.

Column 18, line 1, delete "for" insert ---- from ----.

Column 18, line 2, delete "right" insert ---- rigid ----.

Signed and Sealed this

Thirteenth Day of May, 1997

Attest:

BRUCE LEHMAN

Attesting Officer

Commissioner of Patents and Trademarks